United States Patent [19]

Sasaki et al.

[11] Patent Number: 4,696,800
[45] Date of Patent: Sep. 29, 1987

[54] OZONE GENERATING APPARATUS

[75] Inventors: Toshihiko Sasaki; Yooji Sunayama; Isao Yoshida, all of Hyogo; Masayuki Endo, Okayama, all of Japan

[73] Assignee: Mitsubishi Denki Kabushiki Kaisha, Tokyo, Japan

[21] Appl. No.: 864,384

[22] Filed: May 19, 1986

[51] Int. Cl.⁴ .......................... C01B 13/11; B01J 19/08
[52] U.S. Cl. ............................ 422/186.18; 422/186.15; 422/186.07
[58] Field of Search ...................... 422/186.15, 186.16, 422/186.18, 186.07

[56] References Cited

U.S. PATENT DOCUMENTS

| | | | |
|---|---|---|---|
| 1,379,776 | 5/1921 | Napier | 422/186.18 X |
| 1,971,513 | 8/1934 | Stoddard | 422/186.15 |
| 1,975,424 | 10/1934 | John | 422/186.15 X |
| 3,671,417 | 6/1972 | Louboutin | 422/186.18 |
| 4,293,775 | 10/1981 | Feuerstake et al. | 422/186.15 |
| 4,461,744 | 7/1984 | Erni et al. | 422/186.15 X |

OTHER PUBLICATIONS

Japanese Patents Gazette, Section CH (Chemical), Week 8639, Nov. 5, 1986, J6-J (Chemical Engineering), p. 17, Abstract No. J61186-205-A Derwent Publ. Ltd., London, GB; JP-A-86 256 193 (Mitsubishi Denki) 19-08-1986.

Primary Examiner—Stephen J. Lechert, Jr.
Assistant Examiner—Susan Wolffe
Attorney, Agent, or Firm—Sughrue, Mion, Zinn, Macpeak, and Seas

[57] ABSTRACT

A compact ozone generating apparatus is constituted by a housing fixedly mounting a high voltage transformer casing from which projects a high voltage bushing and which casing fixedly mounts the open end of a cylindrical ground electrode tube of an ozonizer about the high voltage bushing with a brush internally of the cylindrical ground electrode tube directly connecting the high voltage bushing to the ozonizer. The ozonizer further includes an electric glass discharge tube mounted coaxially internally of the cylindrical ground electrode tube with its open end proximate to the open end of the cylindrical ground electrode tube and being spaced therefrom. A conductive bar projects from the high voltage bushing is connected to the brush which spans across the interior of the electric glass discharge tube adjacent its open end and whose ends contact a conductive film lining the inner surface of the electric gas discharge tube.

1 Claim, 3 Drawing Figures

OZONE GENERATING APPARATUS

FIELD OF THE INVENTION

This inventions relates to an ozone generating apparatus, and more particularly to an ozone generating apparatus which is compact and high in safety.

BACKGROUND OF THE INVENTION

Ozone generating apparatus are employed for obtaining ozone by the high voltage discharge in air. FIG. 2 shows the essential components of an ozone generating apparatus, wherein a high voltage transformer 2 is connected to a power source 1 for applying a very high voltage to an ozonizer 4 by a high voltage feeder line 3 which connects the transformer 2 to the ozonizer, and wherein a high voltage discharge occurs within the ozonizer.

FIG. 3 illustrates an example of a conventional ozone generating apparatus. A housing 14 houses a high voltage transformer 2 and an ozonizer 4 which are fixedly mounted side by side and separate from each other. The ozonizer supports a high voltage bushing 5 within the upper, open end of the same. The bare high voltage bushing 5 is connected to a bushing 5a of the high voltage transformer 2 through a high voltage power feeder or line 3.

In the conventional ozone generating apparatus of FIG. 3, there exists the problem that the high voltage transformer 2 and the ozonizer 4 are physically separate from each other, the result of which is that the apparatus is bulky. Additionally, this situation is highly dangerous because the high voltage power feeder or line 3 and the high voltage bushing 5 are relatively exposed.

It is, therefore, an object of the present invention to eliminate the foregoing disadvantages and to provide an ozone generating apparatus which is compact and which is high in safety.

SUMMARY OF THE INVENTION

The present invention is directed to an ozone generating apparatus comprising a housing, a high voltage transformer mounted within said housing and having a casing. An ozonizer is fixedly mounted within said housing, and a high voltage bushing is fixedly mounted to one end of said ozonizer and electrically connected to the transformer. The improvement resides in said ozonizer comprising a cylindrical electrode tube having a closed end and an open end with said open end of said cylindrical electrode tube being fixedly mounted to the high voltage transformer casing and about the high voltage bushing.

DESCRIPTION OF THE PREFERRED EMBODIMENT

Figure 1:
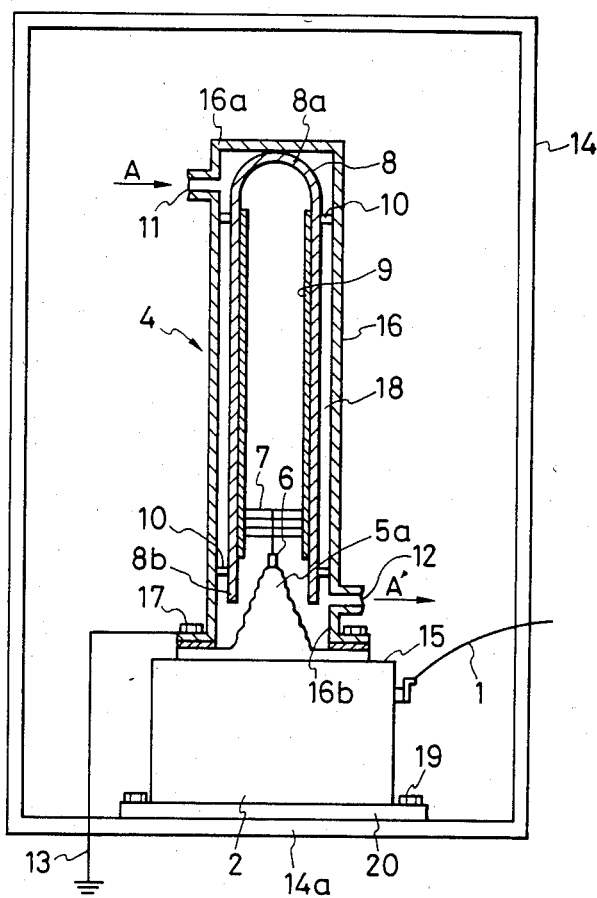
FIG. 1 is a vertical elevational view, partially in section, of an ozone generating apparatus forming a preferred embodiment of the present invention.
Figure 2:
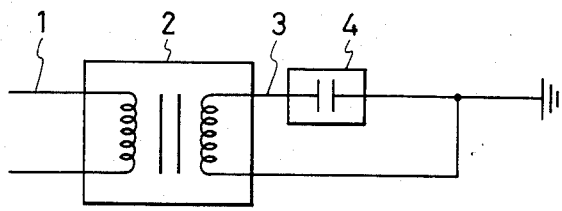
FIG. 2 is an electrically schematic circuit diagram of the basic components of an ozone generating apparatus.
Figure 3:
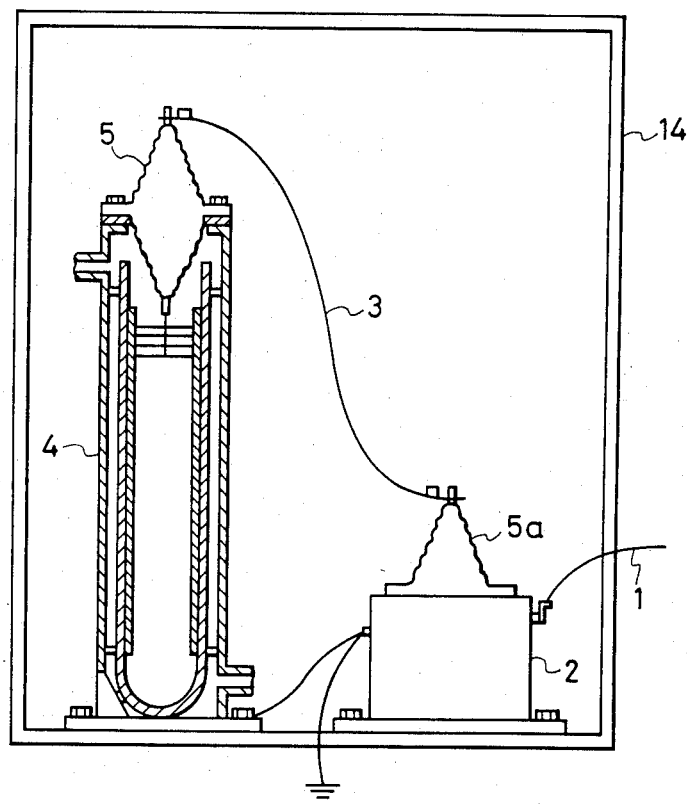
FIG. 3 is a vertical elevational view, partially in section, of a conventional ozone generating apparatus.

Referring to FIG. 1, the preferred embodiment of the ozone generating apparatus of the present invention is composed of a series of components which are identical to that of the prior art apparatus of FIG. 3 and identically numbered. In FIG. 1, the high voltage transformer 2 is fixedly mounted by way of its base 20 to the bottom portion 14a of housing 14 via bolts or screws as at 19. The high voltage transformer 2 is provided with a casing 15 of rectangular form, and mounted to the casing 15 and projecting upwardly therefrom at the center is a high voltage bushing 5a.

Ozonizer 4 is of generally cylindrical form, being provided with a ground electrode tube 16 of elongated cylindrical shape having one end closed at 16a and having its opposite end 16b open and terminating in flanges 16c. Flanges 16c are fixedly mounted via fastening bolts 17 to casing 15 with the open end portion 16b of the ground electrode tube 16 facing downwardly. The high voltage bushing 5a, which is fixed to the upper portion of casing 15, supports a conductive bar 6 which extends vertically upwardly and penetrates through the high voltage bushing 5a at its center to make appropriate connection with the high voltage transformer 2.

Internally of the ground electrode tube 16 of ozonizer 4 is a dielectric glass discharge tube 8, also of cylindrical shape and having one end 8a closed and having its opposite end 8b open. The diameter of the dielectric glass discharge tube 8 is smaller than that of the ground electrode tube 16. Tube 8 is insertably mounted within the inside of the ground electrode tube 16 and is fixedly positioned by means of spacers 10, near its closed upper end 8a and its open bottom end 8b. Thus, a space 18 is formed between the ground electrode tube 16 and the dielectric glass discharge tube 8.

A conductive film 9 is formed on the inner surfaces of the electric glass discharge tube 8 and is connected to the projecting end of conductive bar 6 via a power supply brush 7 which spans across the conductive film 9. The ground electrode tube 16 is provided with an air inlet 11 adjacent its upper closed end 6a, and an air outlet 12 is formed within the ground electrode tube 16 adjacent the flange 16c at the open end 16b of that tube. A ground bar 13 is provided for the ground electrode tube 16.

Further, a power source feeder or line 1 extends through housing 14 and connects to the high voltage transformer 2.

In the apparatus described above, when a current is conducted from transformer 2, via bushing 5a, to the dielectric glass discharge tube 8 through conductive bar 6 and the power supply brush 7, and a high voltage is applied across the inner surface of the electric glass discharge tube 8 and the inner surface of the ground electrode tube 16, silent electrical discharge occurs therebetween so as to produce ozone from a part of the air fed into space 18 from air inlet 11, as indicated by arrow A, while ozonized air is removed from outlet 12, as indicated by arrow A'.

As may be appreciated, the ozone generating apparatus of FIG. 1 is highly compact because the high voltage transformer 2, the high voltage bushing 5a, and the ozonizer 4 are integral with each other, and in the illustrated embodiment, constituting a vertically stacked array. The operation of the same is very safe because the high voltage bushing 5a is accommodated within the ground metal of ground electrode tube 16 under conditions where it is surrounded by casing 15 and the ground electrode tube 16.

Although the ground electrode tube 16 and the high voltage bushing 5a constitute one pair in the illustrated embodiment, the invention is applicable to an ozone generating apparatus provided with two pairs or more of earth electrode tubes and high voltage bushings. Moreover, each ground electrode tube 16 and electric glass discharge tube 8 may be of varied shape, so long as they can accommodate the high voltage bushing 5a therein. Furthermore, incidental equipment or ozone processing equipment for the ozone generating apparatus may be further accommodated in the housing 14 and the ozone generating apparatus itself may be oriented horizontally rather than vertically as shown, while being maintained in integrated fashion in accordance with FIG. 1 and in contrast to that of FIG. 3.

In general, the ozone generating apparatus of the present invention is characterized by the high voltage bushing being fixed to the casing of the high voltage transformer and inserted interiorly of the cylindrical shaped ozonizer through an open end thereof with the other end of the ozonizer being closed and the ozonizer and the casing of the voltage transformer being fixedly coupled to each other. As a result thereof, the structural assembly is highly compact since the high voltage transformer is integrated directly with the ozonizer and the safety of operation is improved because the high voltage bushing is maintained internally of the ozonizer so as to obviate the exposure of any portion thereof.

While the invention has been particularly shown and described with reference to a preferred embodiment thereof, it will be understood by those skilled in the art that various changes in form and details may be made therein without departing from the spirit and scope of the invention.

What is claimed is:

1. In an ozone generating apparatus comprising:
a housing,
a high voltage transformer within said housing,
a casing enclosing said high voltage transformer,
an ozonizer fixedly mounted within said housing,
a high voltage bushing fixedly mounted to one end of said ozonizer and electrically connected to said high voltage transformer,
the improvement wherein said ozonizer comprises:
a cylindrical ground electrode tube having a closed end and an open end,
a dielectric glass discharge tube of cylindrical shape, of a diameter less than that of the ground electrode tube, insertably mounted within the inside of said ground electrode tube, and fixedly spaced therefrom and having a closed end and an open end, said open end being proximate to the open end of the ground electrode tube,
a conductive film formed on the inner surface of the electric glass discharge tube,
said high voltage bushing is fixedly mounted to said high voltage transformer casing and projects outwardly thereof, wherein said open end of said cylindrical ground electrode tube is fixedly mounted to said high voltage transformer casing about said high voltage bushing, and
means internally of the cylindrical ground electrode tube for directly connecting said high voltage bushing to said ozonizer comprising a conductive bar extending outwardly of said high voltage bushing into the open end of said electric glass discharge tube is proximity to said conductive film, and a power supply brush connecting the end of said conductive bar to said dielectric glass discharge tube conductive film.

* * * * *